2,754,288
PETROLEUM RESINS USING CYCLODIENE MONOMERS

Fred W. Banes and Joseph F. Nelson, Westfield, N. J., assignors to Esso Research and Engineering Company, a corporation of Delaware No Drawing. Application July 10, 1953,
Serial No. 367,373

4 Claims. (Cl. 260—82)

This invention relates to a novel process for improving the quality of petroleum hydrocarbon resins and, more particularly, to a continuous process in which petroleum resins are improved by the addition to the feed streams of limited amounts of cyclopentadiene monomers under critical conditions.

Hydrocarbon resins can be produced from certain unsaturated petroleum refinery streams containing mixtures of olefins and diolefins by such methods as polymerization using Friedel-Crafts catalysts. The steam cracked distillates have been found especially useful for this purpose.

Such distillates are prepared by cracking petroleum fractions as kerosene, gas oil, naphtha or residua in the presence of 50 to 90 mole per cent steam at temperatures of about 1000° F. to 1600° F. The liquid cut boiling largely below $C_{10}$ ordinarily contains 3 to 5% cyclopentadiene monomers and the concentration of these materials is reduced below about 2% by heating the fraction for 6 to 10 hours at about 90 to 140° C. to dimerize the cyclopentadienes. All, or a selected portion of this dimerized stream having less than about 2% cyclopentadiene monomers is topped to about 38° C. to remove a dilute isoprene fraction. The bottoms from this topping operation, together with any untopped material which by-passes this distillation, is used as the basic polymerization feed.

It is desirable, when carrying out polymerization reactions using petroleum fractions, to obtain resins having relative high content of cyclopentadiene polymerized therein. The presence of these cyclopentadienes gives resins having much higher softening points and also gives greatly improved yields of these more desired resins. However, despite the improved yields and higher softening points, the cyclopentadiene monomers including both cyclopentadiene and methylcyclopentadienes give highly gelled, insoluble products when they are added as monomers into batch type polymerizations. These cyclopentadiene monomers cannot be tolerated in the start up feed in a continuous polymerization system in concentrations above about 2%. Concentrations above this value, when present in the start up feed, result in products containing substantial amounts of gel. On the other hand, it requires about 5% or more of the monomers in the polymerizing feed in order to give an appreciable improvement in softening point and in over all yield of resin. Thus, to achieve the best effects from the cyclopentadiene monomers, it is necessary to operate under critical conditions and using restricted amounts of the monomer material, so that the monomers are always maintained at a relatively low concentration.

It has been found that if a total quantity of from 5% up to about 15% concentration of the cyclopentadiene monomers are present in the total feed undergoing polymerization, and the polymerization is carried out in a continuous manner, resins of improved yield and no gel content are obtained. Operating in this manner, it is possible to obtain the improved resins and yet avoid completely the disadvantages usually associated with the use of amounts of more than 2% of cyclopentadienes in resin feed.

Generally, steam cracked streams contain about 3 to 4% of these monomers prior to thermal treatment. There is less than 2% of the monomers present after dimerization by heat treatment. If the percentage concentration of the cyclopentadiene monomers is over 2%, it is necessary to dimerize the fraction to reduce the value below this figure. Such a procedure is required in order to permit the final concentration of the monomers to be carefully controlled. If there is present in the initial feed material an amount of the monomers of about 2%, then the amount which is preferably added to give the required concentration will be from 3% up to about 13% of monomers.

It has further been found that better results are obtained when the monomers are added and the polymerization carried out in a continuous manner than if the corresponding dimers are employed.

The monomers may be either pure or the material may be a mixture. Either cyclopentadiene monomer itself or the monomers of the methyl and dimethyl or ethyl derivatives may be employed. Concentrates of hydrocarbon fractions containing at least 60% of the monomer materials may also be used successfully.

Hydrocarbon resins to which the present invention is applicable are made by treating a hydrocarbon mixture containing diolefins, olefins, aromatics, paraffins, and naphthenes with about 0.25 to 3.0%, based on the unsaturated hydrocarbon feed, of a Friedel-Crafts catalyst such as $BF_3$ or preferably an aluminum halide catalyst such as aluminum chloride and aluminum bromide. The latter catalysts may be used as solids or they may be employed as solutions, slurries or complexes. Hydrocarbon complexes of the catalysts, obtained by reaction of the aluminum halide with a resin raffinate containing about 60% olefins and 40% aromatics, are also quite useful.

Typical hydrocarbon fractions useful for feeds in making these resins boil from 20° to 170° C. Analyses show the following composition:

Distillation range:

| Fraction, ° C.— | Wt. percent |
|---|---|
| 20–70 | 0–60 |
| 70–130 | 65–40 |
| 130–170 | 35– 0 |

Composition:

| | |
|---|---|
| Diolefins | 8–20 |
| Aromatics | 19–49 |
| Olefins | 68–30 |
| Paraffins and naphthenes | 5– 1 |

The polymerization reactions are conducted at temperatures in the range of —30 to +90° C. and preferably from +5° to +75° C. Generally, the amount of total cyclopentadiene monomers added should be restricted to correspond or be equivalent to from 5% up to not more than 15% of cyclopentadiene monomers based on the total feed mixture. Subject to this limitation, the monomers may be used as a concentrate of 60% or higher purity.

In carrying out the continuous operation, the reactor is preferably charged with an unsaturated naphtha substantially free of cyclopentadiene monomers. In any event, the concentration of the materials in monomeric form should be no higher than 2%. The agitator is started and catalyst addition begun and continued over a ⅙ to 1 hour period until the desired catalyst concentration and conversion to resin have been reached in the reactor contents. The reaction temperature is maintained by circulating the contents of the reactor continually through a cooling (or heating) bath. After the desired catalyst concentration has been reached, the appropriate monomer-naphtha blend is admitted to the reactor at a rate that will give a hold-up time of ⅙ to 1 hour or longer within the reactor. At the same time, catalyst addition is started and maintained at a rate to give the desired catalyst concentration based on the hydrocarbon feed. Part of the reaction solution is conveniently drawn off continually to a second agitator reactor which is maintained at about the same (or higher or lower) temperature as the first reactor. This second vessel provides for additional contact time. Product from this second reactor vessel can be withdrawn batchwise or continuously to quenching and washing operations and ultimately to the stripper where the final resin product is recovered.

It also falls within the scope of this invention that a single reactor may be employed or that more than one reactor vessel may be used. In other words, the reactor may involve a single or multiple stage continuous system.

The essential features of the invention are illustrated by the following examples although it is not intended to limit the invention specifically thereto.

EXAMPLE 1

A representative steam cracked distillate boiling in the approximate range of 28 to 140° C. and containing about 22.5 conjugated diolefins, 27.5 aromatics, 48 olefins and 2 paraffins and naphthenes was polymerized alone and in combination with varying amounts of cyclopentadiene and methylcyclopentadiene monomers. The results of batch polymerizations under several conditions of operation are presented in Table I.

To carry out the batch polymerizations, the olefinic feed is contacted with catalyst at the indicated temperature. The catalyst is added over a ¼ to one hour period. After completion of catalyst addition, the reaction is agitated at this temperature for an additional ½ to 1 hour. The product is then quenched with 5% (aqueous) $H_2SO_4$, and water and/or caustic washed throughly. The washed resin solution is then stripped to give the hard resin product. The stripping may be carried out by vacuum or steam distillation. For example, hard resins are conveniently recovered by stripping to a bottoms temperature of about 270° C. at 2–5 mm. Hg or the solutions can be steam stripped for about 2 hours at 260° C. Within limits, higher softening point resins may usually be obtained by increasing the severity and/or time of stripping but only at a sacrifice in resin yield and a corresponding increase in liquid polymer yield.

TABLE I

*Batch polymerizations*

| Experiment No. | Wt. Percent on Total Feed | | Catalyst | | Reaction Temp., °C. | Products, Wt. Percent | | | Resin Properties, Soft. Pt., °C.[3] |
|---|---|---|---|---|---|---|---|---|---|
| | Naphtha A | Co-reactant | Type | Wt. Percent | | Resin | Liq. Pol. | Gel | |
| 1 | 95 | 5 CPD [1] | $AlCl_3$ | 1.0 | 10–15 | 32.0 | 3.8 | 7.2 | 101 |
| 2 | 90 | 10 MCPD [2] | $AlCl_3$ | 2.0 | 40–45 | 35.2 | 5.1 | 7.2 | 118 |
| 3 | 90 | {5 CPD [1] / 5 MCPD [2]} | $AlBr_3$ | 1.0 | 55–60 | 31.5 | 5.0 | 8.0 | 104.5 |
| 4 | 85 | 15 CPD [1] | $AlCl_3$ | 0.5 | 15–20 | 25.7 | 2.0 | 19.0 | 111 |
| 5 | 100 | | $AlCl_3$ | 1.0 | 25 | 34.0 | 6.6 | | 90.7 |
| 6 | 100 | | $AlBr_3$ | 1.0 | 25–30 | 33.8 | 6.9 | | 91.0 |

[1] Cyclopentadiene.
[2] Methylcyclopentadiene.
[3] Ring and ball method (ASTM E-28-51-T).

As shown by these batch polymerizations, a substantial improvement in resin softening point can be realized by adding the indicated monomers to the naphtha feed. However, this advantage is completely offset by the production of relatively large amounts of insoluble product (gel) which fouls the reactor and transfer lines of the batch reaction equipment. This gelled material is also difficult to remove from the resin solution by filtration.

EXAMPLE 2

When hydrocarbon feeds similar to those described in Example 1 were polymerized continuously using the operation described in detail above, even higher yields of high softening point resins were obtained and no gel or insoluble products were obtained in any case in which 15% or less of the monomers was employed. The results of the continuous runs are summarized below in Table II. The amout of liquid polymer is not substantially increased by using the continuous method. Although it is preferable to blend the feed streams, the cyclopentadiene monomers may be added at a controlled rate by means of a second feed point. When operating in this manner, good agitation is necessary to avoid localized spots of high monomer concentrations.

TABLE II

*Continuous polymerizations*

| Experiment No. | Wt. Percent on Total Feed | | Catalyst | | Reaction Temp., °C. | Product, Wt. Percent | | | Resin Properties, Soft. Pt.[2] |
|---|---|---|---|---|---|---|---|---|---|
| | Naphtha A | Co-reactant | Type | Conc., Wt. Percent | | Res. | Liq. Pol. | Gel | |
| 7 | 100 | | $AlCl_3$ | 1.0 | 40–45 | 35.0 | 8.4 | | 98 |
| 8 | 100 | | $AlCl_3$ | 2.0 | 40–45 | 38.0 | 9.6 | | 90 |
| 9 | 100 | | $AlBr_3$ | 1.0 | 10–15 | 32.2 | 5.0 | | 96 |
| 10 | [1] 95 | 5 CPD | $AlCl_3$ | 1.0 | 10–15 | 38.8 | 3.6 | | 103 |
| 11 | 95 | 5 CPD | $AlBr_3$ | 1.0 | 15–20 | 32.5 | 5.0 | | 103 |
| 12 | [1] 90 | 10 MCPD | $AlCl_3$ | 2.0 | 40–45 | 43.3 | 4.8 | | 114 |
| 13 | [1] 90 | {5 MCPD / 5 CPD} | $AlBr_3$ | 1.0 | 55–60 | 42.6 | 2.7 | | 117 |
| 14 | 90 | 10 Mixed CPD | $AlCl_3$ | 0.5 | 25 | 33.3 | 4.0 | | 105 |
| 15 | [1] 85 | 15 CPD | $AlCl_3$ | 0.5 | 15–20 | 41.7 | 2.4 | | 114 |
| 16 | 80 | 20 CPD | $AlBr_3$ | 0.5 | 55–60 | | | 20 | |

[1] 4 pts. CPD, 3.4 pts. MCPD, 0.6 pt. dimethyl and ethyl CPD's, 0.6 pt. isoprene and piperylene and 1.4 pts. $C_8$–$C_{10}$ aromatics.
[2] Ring and ball method (ASTM E-28-51-T).

EXAMPLE 3

Run #12 (Table II) was carried out using a feed containing 10% of methylcyclopentadiene dimer rather than monomer. All other reaction conditions and reactants were held constant. The resin product in this case represented a 40.1% yield of 108° C. softening point resin. No gel was produced, however the yield of liquid polymer was 6.2 wt. percent on the feed. These data show that the use of monomer rather than dimer in the continuous process gives improved resin yields and less undesirable liquid polymer.

What is claimed is:

1. A process for preparing resins from unsaturated steam-cracked petroleum streams which comprises initially polymerizing an unsaturated hydrocarbon fraction boiling from 20 to 170° C. and containing diolefins, olefins, aromatics, paraffins and naphthenes, and substantially free of cyclopentadiene monomers, by adding thereto an aluminum halide catalyst, thereafter continuously charging to the reacting mixture a mixture of said hydrocarbon fraction and an amount of another hydrocarbon fraction having at least 60 weight per cent cyclopentadiene monomers such that an equivalent of from 5 up to 20 weight per cent of pure monomers is present based on the total polymerization feed mixture and continuously conducting said polymerization at a temperature within the range of −30 to +90° C., in the presence of the aluminum halide polymerization catalyst.

2. A process for preparing resins from unsaturated steam-cracked petroleum streams which comprises initially polymerizing an unsaturated hydrocarbon fraction boiling from 20 to 170° C., and substantially free of cyclopentadiene monomers, by adding thereto aluminum chloride, thereafter continuously charging to said reacting mixture a mixture of said hydrocarbon fraction and an amount of another hydrocarbon fraction having at least 60 weight per cent cyclopentadiene monomers such that an equivalent of from 5 up to 15 weight per cent of pure monomers is present based on the total polymerization feed mixture and continuously conducting said polymerization at a temperature within the range of +5 to +75° C. in the presence of about 0.25 to 3.0% aluminum chloride.

3. A process for preparing improved petroleum resins which comprises continuously adding 0.25 to 3.0% of an aluminum halide to a hydrocarbon fraction of $C_5$ to $C_9$ components containing not over 2% of cyclopentadiene monomers at a temperature of −30 to +90° C., thereafter adding a sufficient amount of cyclopentadiene monomers to bring the total amount of these monomers in the reaction mixture up to 5 to 20%, and continuing the polymerization.

4. Process according to claim 3 in which the catalyst is aluminum chloride and the temperature is maintained at from +5 to +75° C.

References Cited in the file of this patent

UNITED STATES PATENTS 2,394,641  Soday _____ Feb. 12, 1946